United States Patent [19]

Hessenauer

[11] Patent Number: 4,993,364

[45] Date of Patent: Feb. 19, 1991

[54] AUTOMATICALLY OPERATED PET FOOD DISPENSER

[76] Inventor: John N. Hessenauer, 1073 Chokecherry Dr., Winter Springs, Fla. 32707

[21] Appl. No.: 536,976

[22] Filed: Jun. 12, 1990

[51] Int. Cl.⁵ .............................................. A01K 5/02
[52] U.S. Cl. ................................. 119/51.11; 119/56.1; 222/136
[58] Field of Search .................... 222/136, 411; 119/51.11, 51.12, 51.13, 56.1, 56.2

[56] References Cited

U.S. PATENT DOCUMENTS

| | | | |
|---|---|---|---|
| 1,540,290 | 6/1925 | Selinger et al. | 119/56.1 |
| 1,572,981 | 2/1926 | Aldrich et al. | 119/56.1 |
| 3,088,437 | 5/1963 | Willems | 119/56.1 |
| 3,115,866 | 12/1963 | Lawson, Jr. | 119/51.12 |
| 3,144,002 | 8/1964 | Vilain | 119/56.1 |
| 3,543,727 | 12/1970 | Reed | 119/56.1 |
| 3,561,403 | 2/1971 | Wilson, Sr. et al. | 119/51.11 |
| 4,422,409 | 12/1983 | Walker et al. | 119/51.11 |
| 4,522,152 | 6/1985 | Meyer | 119/56.1 |
| 4,656,969 | 4/1989 | Rapp et al. | 119/51.11 |
| 4,665,862 | 8/1987 | Pitchford, Jr. | 119/51.11 |
| 4,688,520 | 8/1987 | Parks | 119/51.11 |
| 4,922,857 | 5/1990 | Arentoft | 119/51.11 |

Primary Examiner—Paul J. Hirsch
Attorney, Agent, or Firm—Jack N. McCarthy

[57] ABSTRACT

An automatic feeding dispenser has a housing for containing feed, a feed measuring and dispensing device, and an outlet for directing feed to a desired location. The housing has a removable partition to have two types of feed delivered, one from a compartment at each end of a cylindrical delivery tube. The control actuates the rotating tube at desired times in one or more half-turns for each meal as selected.

18 Claims, 3 Drawing Sheets

AUTOMATICALLY OPERATED PET FOOD DISPENSER

Technical Field

This invention relates to a device for automatically dispensing pet food when desired.

1. Background Art

Prior art known to applicant is set forth in the following patents: U.S. Pat. Nos. 107,156; 345,389; 735,167; 995,812; 2,565,801; 2,793,791; 3,578,209; and 4,279,221.

2. Disclosure of Invention

It is an object of this invention to provide a uniquely simplified design for a pet feeder which is able to provide a multiple variety of controlled daily rations to all types of domesticated pets.

Another object of this invention is to provide a device for controlling dispersement of a dry granular chow and other like foods at predetermined intervals without any manual assistance.

A further object of this invention is to provide a means for storage of the granular chow and other like foods suitable for lasting over a given period of time.

Another object of this invention is the capability of the housing to store and automatically dispense a multiple variety of granular chow and other like foods one after the other.

A further object of this invention is to provide a control in which the times of day can be selected for the automatic dispensing of pet food, and the amount of food to be dispensed can be set.

Another object of this invention is to provide a control for automatically starting and stopping rotation of a cylindrical tube at multiples of onehalf turns for a single feeding.

A further object of this invention is to provide a control including a timer, an interval delay device, a micro-switch, and a motor connected to automatically turn said motor "on" by said timer and "off" by said interval delay device and micro-switch.

BEST MODE FOR CARRYING OUT THE INVENTION

Figure 1:
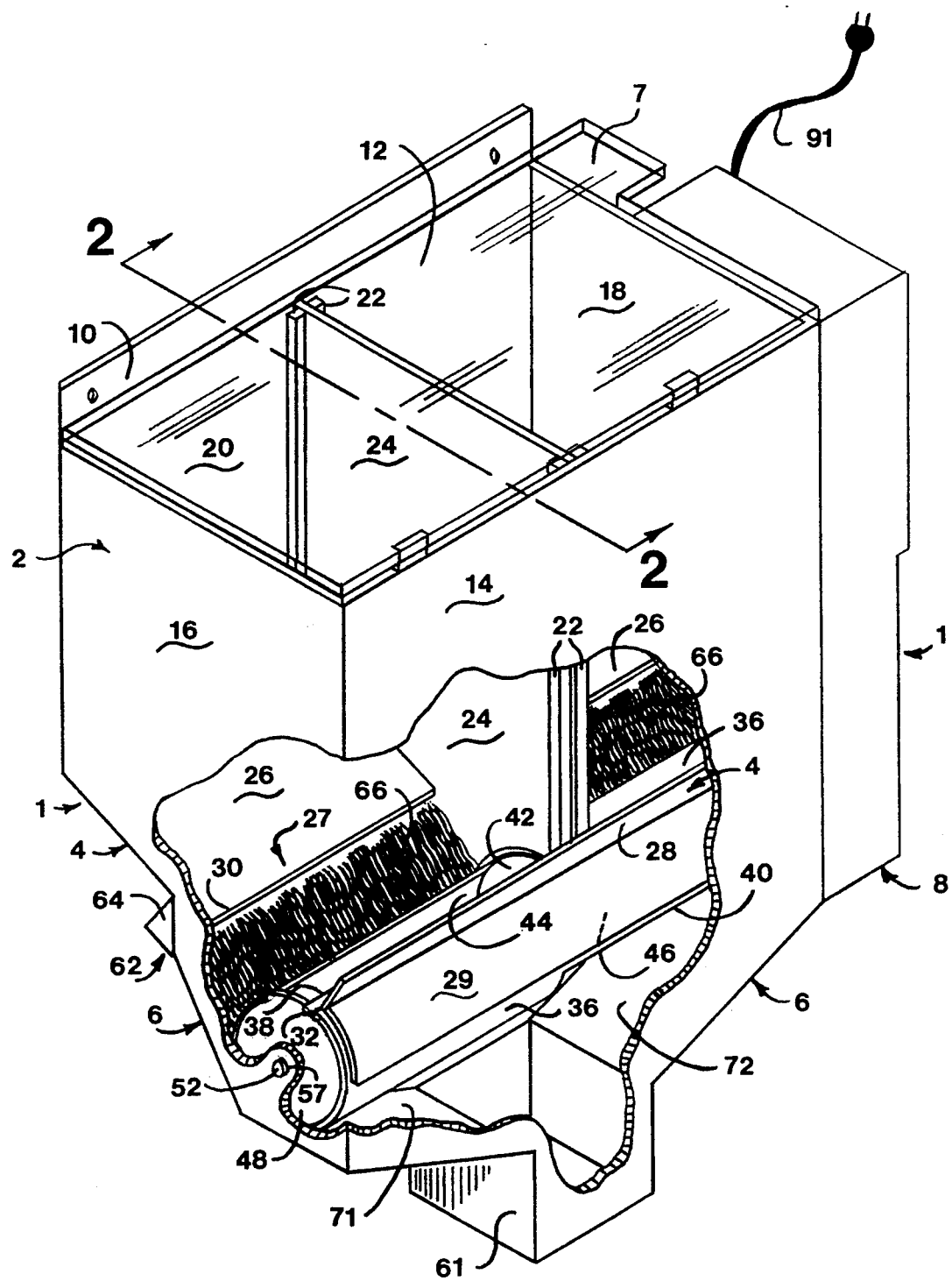
FIG. 1 is a perspective view taken from the top of the pet food dispenser with a portion of the front and side walls removed, exposing internal components.

An automatically operated pet food dispenser 1 is formed of five main parts:

(1) a rectangular upper housing portion 2 for receiving and holding feed;
(2) an intermediate tapered housing portion 4 connected to said housing portion 2 for directing feed to an elongated rectangular open area;
(3) a feed measuring and dispensing device 27 below said open area to receive feed, measure it and dispense it;
(4) a lower housing portion 6 connected to said intermediate tapered housing portion 4 directing feed from said feed device 27 to an outlet for delivery to a bowl or feeding area; and
(5) a controller assembly 8 for operating said feed device 27 as desired.

Figure 2:
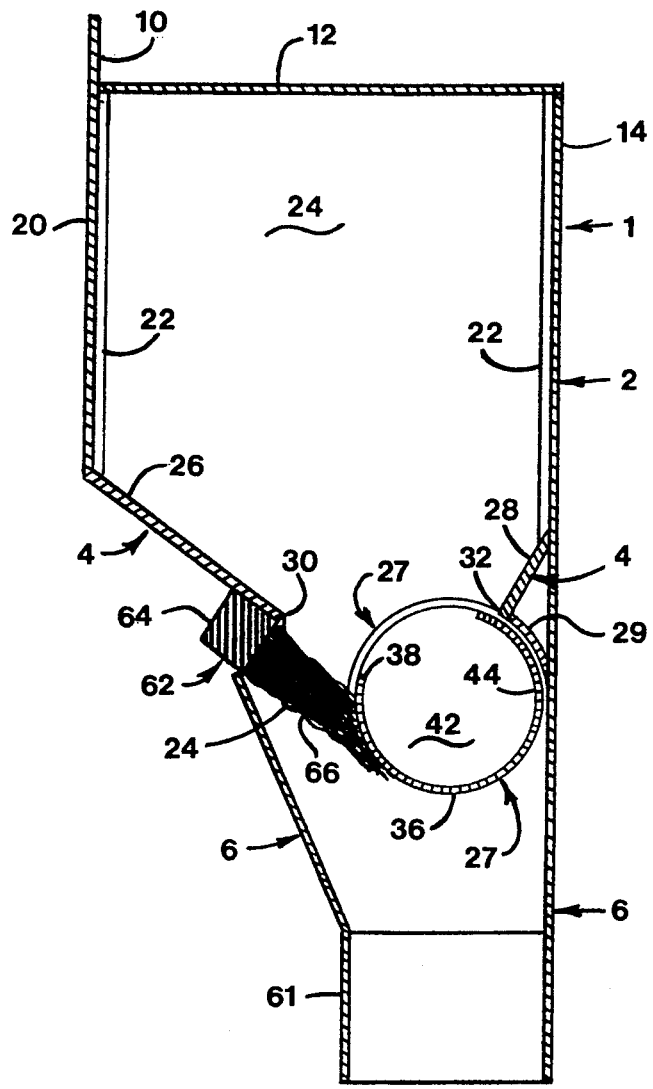
FIG. 2 is a side elevation cross-sectional view taken on the line 2—2 of FIG. 1.
Figure 3:
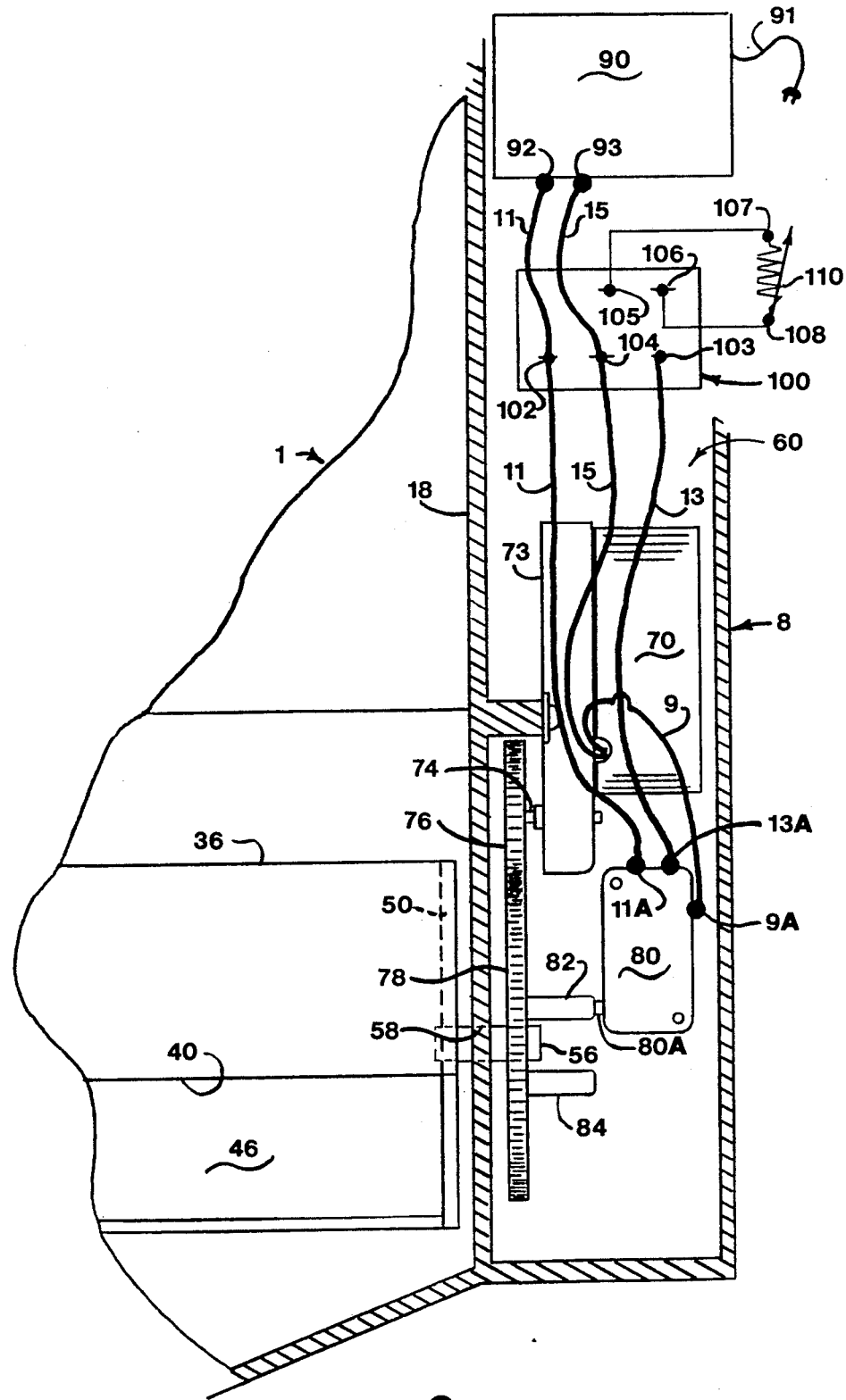
FIG. 3 is a fragmentary cross-sectional view of the control unit with a schematic of the electrical system.

The food dispenser 1 is shown as a wall mounted unit in FIG. 2. A flange 10 at the top of the rear wall of upper housing portion 2 is adapted to be fixed to a wall. The food dispenser 1 can be mounted in any other manner desired. A cover 12 prevents (1) the entry of undesirable objects which may be dangerous for a pet to eat; and (2) the attraction of bugs, or mice, for example. The cover 12 can be made of a transparent material so that the interior can be seen without lifting the cover 12. A tab 7 is provided to lift the cover 12 when necessary.

Rectangular upper housing portion 2 is comprised of a front wall 14, side walls 16 and 18, and a rear wall 20. Guide strips 22 are placed on the inner sides of front wall 14 and back wall 20 to provide grooves to receive a removable partition 24 when it is desired to have two types of feed to be hereinafter described.

Intermediate tapered housing portion 4 is comprised of a rear downwardly angled wall 26 and a front downwardly angled wall 28. Rear angled wall 26 is fixed to the bottom of rear wall 20 and side walls 16 and 18 and ends in an edge 30. Front angled wall 28 is fixed to the front wall 14 and side walls 16 and 18 and ends in an edge 32. Edge 32 is spaced from edge 30 forming an elongated opening between them from side wall 16 to side wall 18. A downwardly extending concave wall 29 connects the edge 32 to front wall 14 and is curved to accommodate a hollow cylindrical tube 36. Lower concave wall 29 is also connected to the side walls 16 and 18.

Feed measuring and dispensing device 27 includes the hollow cylindrical tube 36 and brush assembly 62 between the edges 30 and 32 of the elongated opening. Hollow cylindrical tube 36 has like opposite elongated openings 38 and 40 at each end of the tube 36 and positioned 180° apart. A divider disk 42 is located at the center of the hollow cylindrical tube 36 and divides the hollow cylindrical tube 36 into separate ration compartments 44 and 46, connected to openings 38 and 40, respectively. End disks 48 and 50, one at each end of the hollow cylindrical tube 36, form the outer ends of each compartment 44 and 46, respectively.

A shaft stub 52 extends from end disk 48 into an opening 57 in the side wall 16 to rotatably support that end of the hollow cylindrical tube 36, and a longer shaft stub 56 extends from end disk 50 through an opening 58 in the side wall 18 to be connected to a drive mechanism 60.

A pliant brush assembly 62 having a base member 64 and bristle portion 66 serves in conjunction with the housing 2 and hollow cylindrical tube 36 to provide a seal between the edge 30 of the rear downwardly angled wall 26 of tapered housing portion 4 of housing 2 and the rotating cylindrical tube 36 to direct the pet chow, or food, contained in the housing 2 into the openings 38 and 40 with a minimum of leakage, and level the portion of food in the compartments 44 and 46 as the opening 38 or 40 passes the bristle portion 66 of the brush assembly 62. Base member 64 is fixed to the rear downwardly angled wall 26 by any known means.

Each compartment 44 and 46 dumps its portion of pet food, in turn, as it passes the bristle portion 66 of the brush assembly 62. This pet food, or feed, enters the lower housing portion 6 and is directed by downwardly tapered surfaces 71 and 72 out of outlet 61 to a bowl, or feeding area.

When only one type of pet food is to be dispensed, the partition 24 is removed. However, if two types of pet food are desired to be used, the partition 24 is put in place and a different type of pet food is placed on each side of the partition 24. The bottom of partition 24 fits against walls 26 and 28, and extends between edges 30 and 32 and is aligned with the divider disk 42 and curved to cooperate with it to prevent leakage between two types of feeds being used. The bottom of partition 24 also extends into the bristle portion 66 of the brush assembly 62 to further aid in sealing (see FIG. 2).

The number of meals to be served to the pet during the day is decided; the time each meal is to be served; also, the amount of food at each meal.

The controller assembly 8 actuates the longer shaft stub 56 when desired. The motor 70 and reduction drive unit 73 has an output shaft 74 which rotates an output driving gear 76, to in turn rotate driven gear 78 and shaft stub 56 on which gear 78 is mounted. It can be seen that this rotates the hollow cylindrical tube 36. Diametrically opposed projections 82 and 84 extend from driven gear 78 to contact a switch trigger 80A on a switch device 80 to provide for stopping the hollow cylindrical tube 36, as hereinafter disclosed. The projections 82 and 84 are rounded at the top to engage and cam switch trigger 80A inwardly. The normal stop position of tube 36 is with one opening 38, or 40, facing upwardly into upper housing portion 2 for receiving feed, and the other opening facing downwardly into lower housing portion 6 for dispensing feed.

The controller assembly 8 is used which will for each day: (1) start rotating the hollow cylindrical tube 36 at one or more desired times; and (2) stop rotating the hollow cylindrical tube 36 after each desired time when it has rotated the desired number of one-half turns to dispense the proper amount of pet food.

The controller assembly 8 comprises a timer 90, an interval delay device 100, and a switch 80. The timer 90 is an off-the-shelf 24-hour timer which can be set to automatically connect a voltage source to its output connectors 92 and 93 for one or more time periods during a 24-hour day. A time period must extend for an amount of time which will permit the motor 70 to turn the hollow cylindrical tube 36 the number of one-half turns necessary to deliver the desired amount of food.

Switch 80 is a stationary microswitch having two input connectors 11A and 13A and one output connector 9A. Switch 80 is an off-the-shelf microswitch which has an internal movable connector which is connected to connector 9A. This movable connector is spring biased to contact connector 11A and is snap-moved by an overcenter spring action to contact connector 13A by being pushed by switch trigger 80A. Switch trigger 80A is cammed into switch 80 by projection 82 or projection 84 to snap the movable connector to contact connector 13A at each half-turn of the hollow cylindrical tube 36, to properly position openings 38 and 40 for operation as mentioned hereinbefore.

Interval delay device 100 has three connectors 102, 104, and 103 for connecting the timer 90, to switch 80 and motor 70. A wire, or lead, 11 connects connector 92 of timer 90 to connector 102 of interval delay device 100 and then to connector 11A of switch 80; a wire, or lead, 15 from motor 70 is connected to connector 104 of interval delay device 100 and then to connector 93 of timer 90; a second wire, or lead, 9 from motor 70 is connected to connector 9A of switch 80; and a wire, or lead, 13 connects connector 103 of interval delay device 100 to connector 13A of switch 80.

Connector 102 and connector 103 are connected internally within interval delay device 100, and the internal connection will only conduct between connector 102 and connector 103 for a predetermined amount of time after a voltage has been placed across connectors 92 and 93 to have electricity flow therebetween by timer 90.

When the voltage across connectors 92 and 93 has been removed or "turned off", by timer 90, the internal connection is reset to conduct again when the voltage is again applied by the timer 90 between connector 92 and connector 93. This permits the internal connection between connector 102 and connector 103 to conduct again for the predetermined amount of time, and resetting when the timer 90 again removes or "turns off" the voltage applied across connector 92 and connector 93.

Interval delay device 100 also has two connectors 105 and 106 for connection to connectors 107 and 108, respectively, of a variable resistor 110, whose purpose is to vary the predetermined amount of time the internal connection between connector 102 and connector 103 will conduct. Interval delay device 100 is an off-the-shelf device of NCC. Other companies make similar devices; one such company is International Controls and Measurements Corp.

It can be seen that this predetermined amount of time for conducting controls the number of half-turns the motor 70 will turn the hollow cylindrical tube 36. If only one compartment of pet food is desired at a given time then only one-half turn of the hollow cylindrical tube 36 is needed, then the predetermined amount of time for conducting between connectors 102 and 103, after the timer 90 calls for food, must be a value which will be less than that required to turn the hollow cylindrical tube 36 a full half-turn and have the next projection 82 or 84 contact switch trigger 80A. This value can be set on the variable resistor 110, as well as the times feeding is desired can be set on the timer 90. If the internal connection between connectors 102 and 103 is not conducting when switch trigger 80A next connects connector 13A to connector 9A, the motor will stop, stopping hollow cylindrical tube 36.

If two compartments of pet food are desired for feeding at a given time, then one full turn of the hollow cylindrical tube 36 is needed, and the predetermined amount of time for conducting between connectors 102 and 103 after the timer 90 calls for food, must be a value which will be more than that required to turn the hollow cylindrical tube 36 a full half-turn and less than that required to turn the hollow cylindrical tube 36 a full turn to again actuate switch trigger 80A. When the timer 90 starts the motor 70, it rotates the hollow cylindrical tube 36 and projection 82 or 84 off of switch trigger 80A and connects connector 11A to 9A, when the next projection, 82 or 84, cams switch trigger 80A again, the internal connection between connectors 102 and 103 must still be conducting to rotate the hollow cylindrical tube 36 further. The internal connection between connectors 102 and 103 must cease to conduct before the switch trigger 80A is cammed in again so that the hollow cylindrical tube 36 will stop at one full turn. This logic can continue for a greater number of half-turns needed by hollow cylindrical tube 36 to provide the desired amount of food at a given time, such as oneand-a-half turns to dispense three compartments of food and two full turns to dispense four compartments of food.

I claim:

While the principles of the invention have now been made clear in an illustrative embodiment, it will become obvious to those skilled in the art that many modifications in arrangement are possible without departing from those principles. The appended claims are, therefore, intended to cover and embrace any such modifications, within the limits of the true spirit and scope of the invention.

1. An automatic pet feeding dispenser including a housing for containing feed, an elongated opening at the bottom of said housing for discharging feed from said housing, a feed measuring and dispensing means for receiving feed from said opening, a single outlet means for directing feed dispersed from said feed measuring and dispensing means to a desired location, said feed measuring and dispensing means comprising a cylindrical tube, a divider disk in said cylindrical tube at a midpoint lengthwise divides said cylindrical tube into two axially aligned cylindrical compartments, said cylindrical tube being mounted for rotation, said cylindrical tube having tube openings 180° apart, one tube opening entering into each compartment, means for rotating said cylindrical tube, one tube opening will allow feed to be directed into its associated compartment from said housing through said elongated opening when the one tube opening faces the elongated opening, when the one tube opening faces the elongated opening the other tube opening 180° therefrom is aligned to dump feed out of its associated compartment into said single outlet means, said means for rotating said cylindrical tube alternates the alignment of each tube opening with said elongated opening and single outlet means at each half turn of said cylindrical tube.

2. A combination as set forth in claim 1 wherein said feed measuring and dispensing means includes a resilient seal means; said resilient seal means being fixed to said housing on one side of said elongated opening and extending to contact said cylindrical tube to prevent feed from leaking out of the elongated opening of said housing directly into said single outlet means, to prevent feed from leaking out of the tube opening of a cylindrical compartment as it rotates between its position facing said elongated opening of said housing for receiving feed and its position facing said single outlet means for dumping feed, and to level the feed at the tube opening of the cylindrical compartment for providing a full cylindrical compartment.

3. A combination as set forth in claim 2 wherein said resilient seal means comprises a brush.

4. A combination as set forth in claim 2 wherein said resilient seal means is a sheet of resilient material.

5. A combination as set forth in claim 2 wherein said housing for containing feed has a partition mounted therein extending through said elongated opening, said partition mating with said divider disk dividing said cylindrical tube at said mid-point between said compartments and with said resilient seal means, said partition dividing said housing into two sections for containing two different feeds.

6. A combination as set forth in claim 5 wherein one tube opening cooperates with one of said sections of said housing and the other tube opening cooperates with the other of said sections of said housing, and both tube openings cooperate with said single outlet means.

7. A combination as set forth in claim 5 wherein said partition is removable providing for said automatic feeding dispenser having a single container or a double container for containing one or two kinds of feed.

8. A combination as set forth in claim 1 wherein said means for rotating said cylindrical tube includes control means for setting said automatic pet feeding dispenser for automatically starting and stopping rotation of said cylindrical tube at multiples of one-half turns for a single feeding alternating the positioning of each tube opening with said elongated opening and single outlet means.

9. A combination as set forth in claim 8 wherein said control means includes a timer, a motor, mechanical means connecting said motor to said cylindrical tube for turning it, electrical means connecting said timer to said motor for starting to turn said cylindrical tube at a predetermined time, means for stopping said cylindrical tube at a plurality of one-half turns, means for selecting the number of onehalf turns to be made.

10. A combination as set forth in claim 8 wherein said control means includes a timer having first and second output connectors, a switch having first and second input connectors and one output connector, said switch being normally biased to connect only said first input connector to said one output connector, said switch having actuation means to connect only the second input connector to said one output connector, said first output connector on said timer being connected directly to said first input connector on said switch, said first output connector on said timer being connected for a preset time to said second input connector on said switch, said one output connector on said switch being connected to said motor, said second output connector of said timer being connected to said motor, means mounting two switch actuators 180° apart for rotation with said cylindrical tube to properly position said cylindrical tube for feeding, each of said two switch actuators actuating said actuation means to change the connection of said first output connector on said timer from said first input connector on said switch to said second input connector on said switch at each 180° position, said motor being run continuously for one or more half-turns of said cylindrical tube until said actuation means is actuated by a switch actuator to connect said first output connector on said timer to said second input connector on said switch and said preset time has expired thereby stopping said motor.

11. A combination as set forth in claim 10 including means for controlling said preset time of connection from said first output connector on said timer to said second input connector on said switch for controlling the number of half-turns made by said cylindrical tube.

12. A combination as set forth in claim 2 wherein said resilient seal means comprises a brush, said brush having a base member, said base member having a bristle portion with bristles extending therefrom, said base member being fixed to said housing, said single outlet means having a wall connected to said base member, said bristles of said bristle portion containing said cylindrical tube for sealing.

13. A combination as set forth in claim 5 wherein said resilient seal means comprises a brush, said brush having a base member, said base member having a bristle portion with bristles extending therefrom, said base member being fixed to said housing, said bristles of said bristle portion contacting said cylindrical tube for sealing, said partition extending between said bristles of said bristle portion for further sealing.

14. A combination as set forth in claim 1 wherein said feed measuring and dispensing means includes a resilient seal means, said resilient seal means being fixed to said housing on one side and extends to contact said cylindrical tube to prevent feed from leaking out of said housing directly into said single outlet means and from leaking out of the tube opening of a cylindrical compartment as it rotates, said resilient seal means contacting said cylindrical tube with each tube opening of each cylindrical compartment passing against said resilient seal means so that said resilient seal means levels the feed at a contacted tube opening in a compartment and maintains the feed in said compartment until said contacted tube opening opens into said outlet means below said seal means.

15. An automatic pet feeding dispenser including a housing for containing feed, an elongated opening at the bottom of said housing for discharging feed from said housing, a feed measuring and dispensing means for receiving feed from said opening, said feed measuring and dispensing means comprising a cylindrical tube, a divider disk in said cylindrical tube at a midpoint lengthwise divides said cylindrical tube into two axially aligned cylindrical compartments, said cylindrical tube having only one tube opening for each cylindrical compartment, said cylindrical tube being mounted for rotation, said cylindrical tube openings being 180° apart, a single outlet means for directing feed dispensed from said feed measuring and dispensing means to a desired location, means for rotating said cylindrical tube, one tube opening will allow feed to be directed into its associated compartment from said housing through said elongated opening when the one tube opening faces the elongated opening, when the one tube opening faces the elongated opening the other tube opening 180° therefrom is aligned to dump feed out of its associated compartment into said single outlet means, said means for rotating said cylindrical tube alternates the alignment of each tube opening with said elongated opening and single outlet means at each half turn of said cylindrical tube.

16. A combination as set forth in claim 15 wherein said feed measuring and dispensing means includes a resilient seal means, said resilient seal means being fixed to said housing on one side and extends to contact said cylindrical tube to prevent feed from leaking out of said housing directly into said single outlet means and from leaking out of the tube opening of a cylindrical compartment as it rotates, said resilient seal means contacting said cylindrical tube with each tube opening of each cylindrical compartment passing against said resilient seal means so that said resilient seal means levels the feed at a contacted tube opening in a compartment and maintains the feed in said compartment until said contacted tube opening opens into said outlet means below said seal means.

17. A combination as set forth in claim 16 including guide means fixed in said housing for removably holding a partition for dividing said housing into two sections for containing two different feeds, a removable partition mounted in said guide means dividing said housing into two sections, said partition mating with said divider disk and with said resilient seal means.

18. A combination as set forth in claim 17 with one section of said housing having one feed being aligned with one cylindrical compartment for cooperating with one tube opening, the other section of said housing having another feed being aligned with the other cylindrical compartment for cooperating with the other tube opening, said means for rotating said cylindrical tube alternately delivering feed from the two sections of said housing to said single outlet means alternating the feed dispensed to a desired location for a pet.

* * * * *